United States Patent [19]
Lee

[11] Patent Number: 5,504,805
[45] Date of Patent: Apr. 2, 1996

[54] CALLING NUMBER IDENTIFICATION USING SPEECH RECOGNITION

[75] Inventor: Dooyong Lee, West Orange, N.J.

[73] Assignee: AT&T Corp., Murray Hill, N.J.

[21] Appl. No.: 43,946

[22] Filed: Apr. 5, 1993

[51] Int. Cl.⁶ .................................................. H04M 1/65
[52] U.S. Cl. ........................... 379/67; 379/142; 379/216;
    379/355; 381/42; 381/43; 395/2.5; 395/2.6
[58] Field of Search .................................. 379/67, 88, 89,
    379/216, 355, 52, 142; 381/41, 42, 43;
    395/2.5, 2.6

[56] References Cited

U.S. PATENT DOCUMENTS

| | | | |
|---|---|---|---|
| 4,731,811 | 3/1988 | Dubus | 379/58 |
| 4,961,212 | 10/1990 | Marui et al. | 379/67 |
| 4,979,206 | 12/1990 | Padden et al. | 379/67 |
| 5,283,818 | 2/1994 | Klausner et al. | 379/67 |

FOREIGN PATENT DOCUMENTS 0155752  6/1989  Japan ........................................ 379/70

OTHER PUBLICATIONS

Mechanism to Automate Updating Obsolete Telephone Numbers. IBM Technical Disclosure Bulletin, vol. 37 No. 04A, Apr. 1994.
Method and Apparatus for Automatic Contextual Call Return, Calendering and Address Book Search. IBM Technical Disclosure Bulletin, vol. 37, No. 04A, Apr. 1994.

*Primary Examiner*—Jeffery Hofsass
*Assistant Examiner*—Fan Tsang
*Attorney, Agent, or Firm*—Christopher N. Malvone

[57] ABSTRACT

In a system such as an AUDIX® voice mail system or answering machine, a caller's telephone number is extracted from a recorded message using voice recognition. The called party initiates automatic dialing of the calling party's number after confirming that the number was correctly recognized by the system.

9 Claims, 4 Drawing Sheets

| CALLED PARTY ID | MESSAGE ID | VOICE ADDRESS | PHONE NUMBER ADDRESS |
|---|---|---|---|
| 1 | 1 | 01-10 | 12-18 |
| 3 | 1 | 12-30 | 19-28 |
| 2 | 1 | 32-40 | 29-39 |
| 1 | 2 | 44-52 | 40-52 |
| | | | |
| | | | |

5,504,805

CALLING NUMBER IDENTIFICATION USING SPEECH RECOGNITION

TECHNICAL FIELD

This invention relates to a message-taking apparatus, and more particularly, to a message-taking apparatus that automatically obtains a phone number from a verbal message.

DESCRIPTION OF THE PRIOR ART

In the past, a calling party left a verbal message to a called party on an answering machine or AUDIX® voice mail system. That verbal message typically included a telephone number at which the called party could reach the calling party. Typically, the called party listened to the message and then wrote the phone number on a piece of paper so that the number would be available when the called party placed a telephone call to the calling party. This technique is inconvenient because it requires the called party to have a pen and paper available when listening to the message. It is also possible for the called party to attempt to memorize the phone number while listening to the verbal message. This technique is inconvenient because the called party could incorrectly memorize the number, and as a result, dial an incorrect number while attempting to reach the calling party. Incorrectly memorizing the number creates the additional inconvenience of requiring the called party to listen to the verbal message a second time in order to make a second attempt to memorize the number.

SUMMARY OF THE INVENTION

The present invention solves the aforementioned problems by obtaining a phone number from a verbal message left by a calling party. The phone number is communicated to the called party so that the called party can verify the phone number with the phone number recited in the verbal message. If the called party is satisfied that the phone number was correctly obtained from the verbal message, the called party may issue a command that results in the phone number being dialed automatically.

By automatically extracting a phone number from a verbal message, the present invention eliminates the need for the called party to write down or attempt to memorize a phone number contained in the verbal message. This avoids the inconvenience of requiring the called party to have a pen and paper handy, and it also avoids the inconveniences that result from incorrectly memorizing the calling party's number.

DETAILED DESCRIPTION

Figures 1, 2:
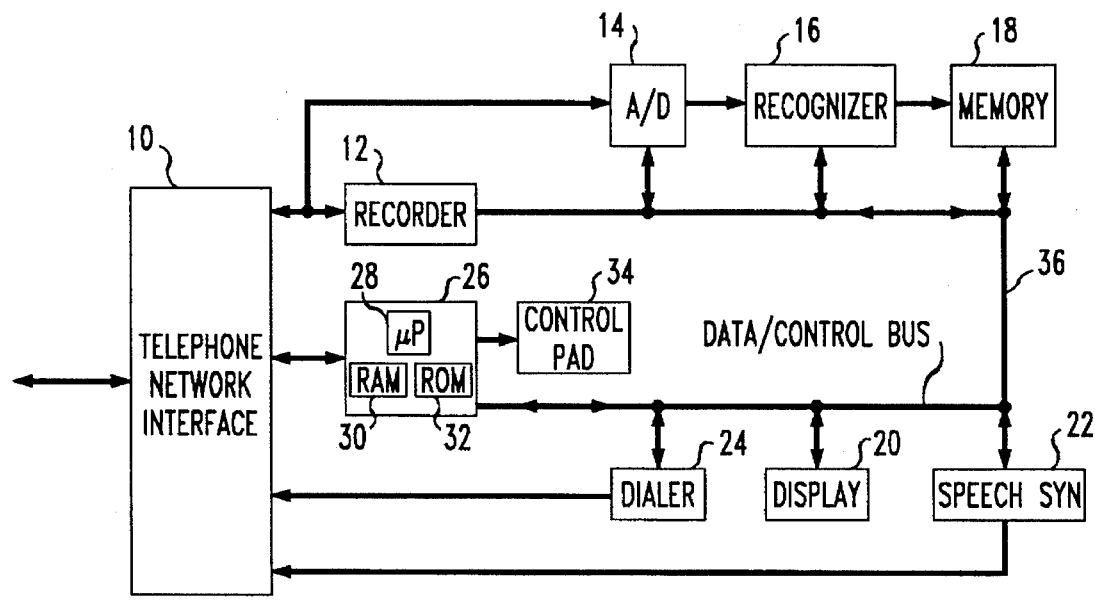
FIG. 1 is a block diagram of the present invention.
FIG. 2 illustrates a table that is used to keep track of messages and phone numbers stored by the present invention.

FIG. 1 is a block diagram of the present invention. Telephone network interface 10 is used to interface the present invention to a telephone network. This network interface can be in the form of many well-known circuits such as a hybrid or other circuits that are used to interface to a PBX or central office. Recorder 12 is used to record the verbal messages left by a calling party and it may be used to play greetings and/or prompts to the calling party. Recorder 12 can be analog or digital in nature, and can be constructed using a tape recorder, disk memory or solid state memory.

Analog to digital (A/D) converter 14, word recognizer 16 and memory 18 are used to extract or obtain a phone number from a verbal message left by the calling party. A/D converter 14 converts the analog signal received from telephone network interface 10 into a digital signal. It is also possible for A/D converter 14 to receive its input from the output of recorder 12. Recognizer 16 receives its input from A/D converter 14. Recognizer 16 can be any type of word recognizer that can recognize a spoken phone number. Recognizer 16 should be speaker independent and it is preferable to simplify the recognizer's design by using a recognizer that is only capable of recognizing numbers and a limited number of verbal commands. It is also possible to use more complex recognizers. A recognizer that compares characteristics of an utterance to a stored template, or a recognizer such as a neural network implemented in either hardware or software may be used to implement recognizer 16. Word recognizers are known in the art and a Conversant® speech processor available from AT&T may be used to implement recognizer 16. Memory 18 receives the recognized phone number from recognizer 16. The phone number is stored in memory 18 until it is needed by the called party. When the called party replays the recorded message, the phone number stored in memory 18 is displayed on display 20, and may be recited in an audio message using speech synthesizer 22. Speech synthesizer 22 may also recite greetings and/or prompts to the calling party. Speech synthesizers are known in the art and a Conversant® speech processor available from AT&T may be used to implement speech synthesizer 22. It is preferable to display or otherwise convey the phone number from memory 18 to the called party before replaying the message to the called party. This offers the advantage of allowing the called party to see and/or hear the phone number before listening to the recorded message. After listening to the recorded message and verifying that the phone number from memory 18 is correct, the called party can automatically dial the phone number from memory 18 by enabling dialer 24. Automatic dialers are known in the art and can be in the form of pulse dialers or DTMF (dual tone multiple frequency)dialers.

Overall control for the invention is carried out by controller 26 which comprises microprocessor 28, RAM 30 and ROM 32. Microprocessor 28 can be any of the commercially available microprocessors, microcomputers or even specialized hardware. RAM 30, which is used as a scratch pad memory, may be implemented using any of the widely available random access memories. ROM or read only memory 32 can be constructed using any of the commercially available ROMS, PROMS or EEROMS to store the overall programming for controller 26. Control pad 34 is used by the called party to command controller 26. These commands include play, replay, record greeting, record prompt, dial and erase message. It is also possible for controller 26 to receive commands through telephone network interface 10 in a form such as DTMF signals that are entered using a telephone keypad. This feature enables the called party to access his/her messages and to issue commands to controller 26 from a remote location. It is also possible for controller 26 to receive verbal commands recognized by recognizer 16.

Controller 26 uses data/control bus 36 to communicate with the different components of the present invention. For example, controller 26 uses bus 36 to transfer a phone number from memory 18 to dialer 24, display 20 and speech synthesizer 22. Controller 26 also uses bus 36 to control recorder 12 and the other components connected to the bus.

FIG. 2 illustrates a table that microprocessor 28 places in RAM 30 to keep track of messages and phone numbers. The called party ID column is used to keep track of messages that are addressed to different called parties. This column is necessary when the invention is used or located in a public exchange such as a PBX or central office. When used or located at a customer's premises or in an environment where it is not necessary to distinguish between called parties, the called party ID column is unnecessary. The second column is used to keep track of individual messages when more than one message is left for the same called party. A third column is used to store the beginning and end addresses for a voice message stored in recorder 12. These addresses can be in a form that refers to locations in a RAM or disk memory, or they may refer to locations identified by a tape recorder's tape counter. A fourth column is used to keep track of the beginning and end addresses that are used to locate a phone number within memory 18. The number of memory locations used to store the phone number varies with the length of the phone number. For example, seven locations are used for a simple local phone number, while ten or more locations are used for phone numbers that involve area codes, country codes or telephone extensions.

Figure 3:
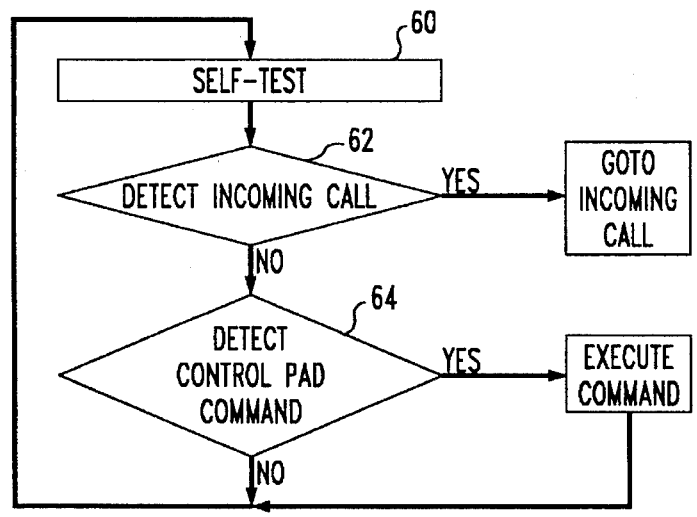
FIG. 3 is a flow chart of a control routine executed by the present invention.

FIG. 3 illustrates a flow chart for a control loop executed by microprocessor 28. Step 60 involves a self-test which is followed by decision step 62. In decision step 62, if an incoming call is detected, an incoming call routine is executed, and if an incoming call is not detected, decision step 64 is executed. In decision step 64, if a command is received from control pad 34, the command is executed, and if a command is not detected, the loop restarts at self-test step 60.

Figure 4:
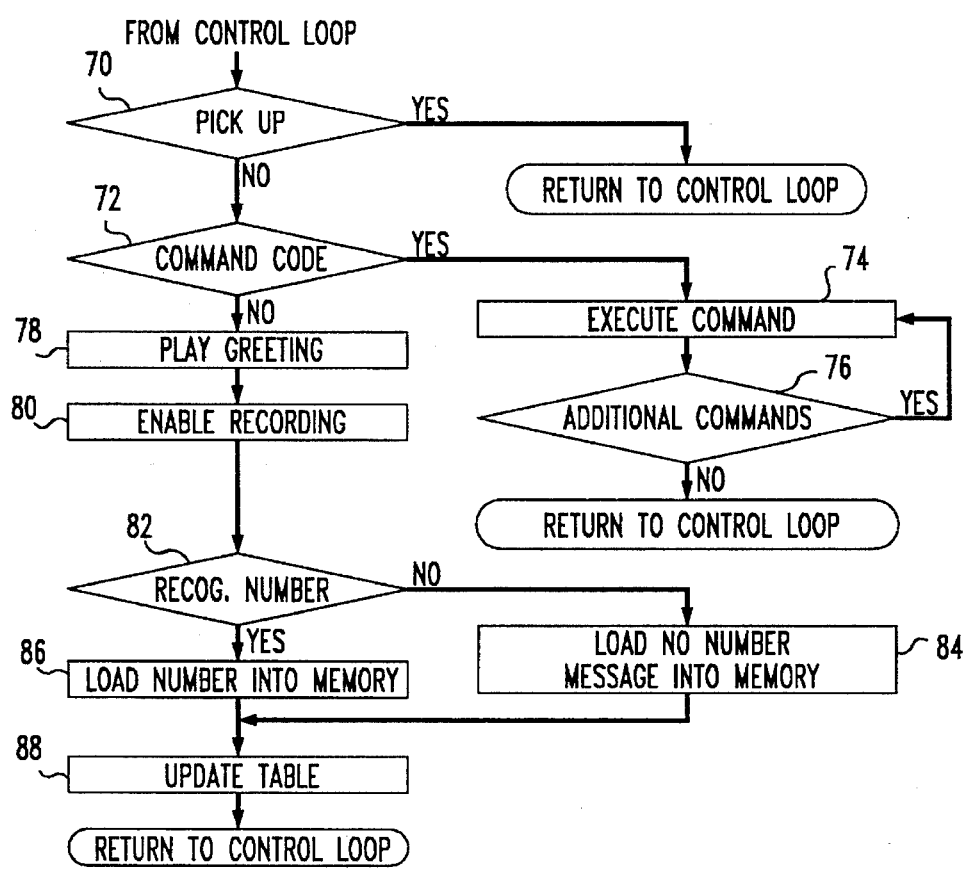
FIG. 4 is a flow chart of an incoming call routine.

FIG. 4 illustrates an incoming call routine. After detecting an incoming call in step 62 of FIG. 3, decision step 70 of FIG. 4 is executed. If microprocessor 28 detects that the called party picked up the receiver, microprocessor 28 returns to the control loop of FIG. 3. When the called party does not pick up the receiver, decision step 72 is executed. If an incoming command from telephone network interface 10 is detected, that command is executed in step 74. After executing the command in step 74, decision step 76 is executed to determine whether additional commands have been received. If an additional command was received, it is executed in step 74, and if no additional commands were received, microprocessor 28 returns to the control loop. With reference to decision step 72, if a command was not received, it is assumed that a calling party is attempting to leave a message and step 78 is executed. In step 78, a greeting is played to the calling party using recorder 12 or speech synthesizer 22. After playing the greeting, step 80 enables recorder 12 to record a message from the calling party. After step 80, decision step 82 is executed. In decision step 82, if a phone number is not recognized in the verbal message provided by the calling party, a "no number" message is loaded into memory 18 in step 84. If a number is recognized in the verbal message provided by the calling party, the phone number is loaded into memory 18 in step 86. After loading memory 18 with the appropriate information, step 88 is executed to update the table of FIG. 2. In step 88, microprocessor 28 returns to the control loop of FIG. 3.

Figure 5:
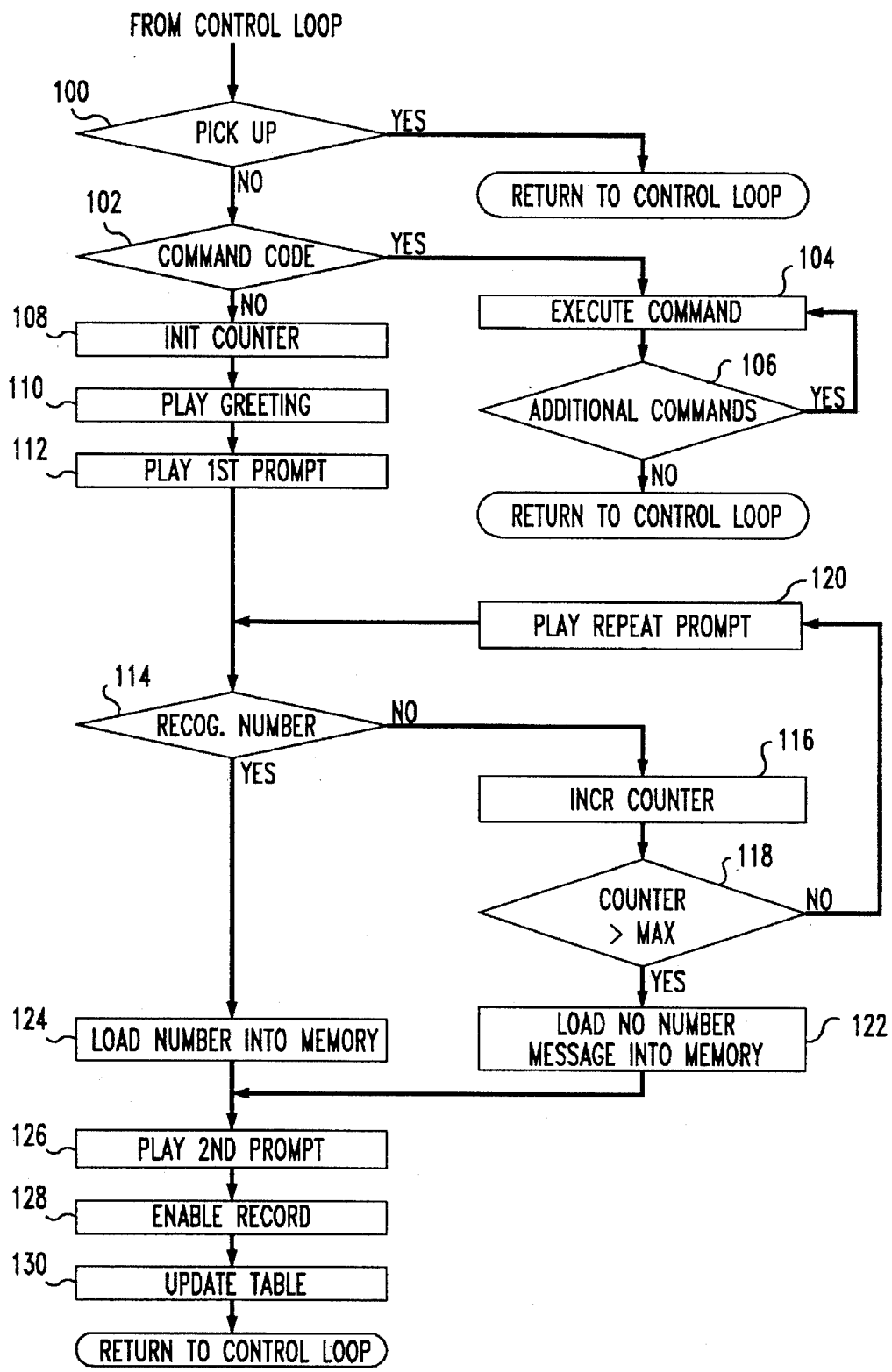
FIG. 5 is a flow chart of an alternative incoming call routine.

FIG. 5 illustrates a flow chart for an alternative incoming call routine. After executing step 62 of FIG. 3, decision step 100 of FIG. 5 is executed. If microprocessor 28 detects that the called party picked up the receiver, microprocessor 28 returns to the control loop, and if it detects that the receiver is not picked up, decision step 102 is executed. If decision step 102 determines that a command was received from telephone network interface 10, the command is executed in step 104. After executing the command in step 104, decision step 106 determines if additional commands have been received. If an additional command was received, it is executed in step 104. If no additional command was received, microprocessor 28 returns to the control loop. If a command is not detected in step 102, a counter is initialized to zero in step 108. After executing step 108, step 110 plays a greeting to the calling party using recorder 12 or speech synthesizer 22. After playing the greeting, a first prompt is played to the calling party in step 112 using recorder 12 or speech synthesizer 22. The first prompt is used to prompt the calling party to state the phone number at which he or she can be reached. In decision step 114 it is determined whether a number was recognized from the verbal message provided by the calling party. If a number was not recognized, step 116 increments a counter. Decision step 118 determines whether the counter has exceeded a maximum count. This counter is used to limit how many times an attempt will be made to obtain a phone number from the verbal message. A convenient number such as three may be used as the maximum count. If the count is less than or equal to the maximum count, step 120 plays a repeat prompt using recorder 12 or speech synthesizer 22. This prompt requests that the calling party repeat the number at which the calling party can be reached. Once again, decision step 114 is executed to determine if the number was recognized. If it was not recognized, steps 116 and 118 are executed again. If step 118 determines that the count has exceeded the maximum count, step 122 is executed by loading a "no number" message into memory 18. Turning back to decision step 114, if a number was successfully recognized in the message provided by the calling party, the number is loaded into memory 118 by executing step 124. After executing step 124, step 126 plays a second prompt, which asks the calling party to provide any additional information that he or she deems necessary, using recorder 12 or speech synthesizer 22. After playing the prompt, step 128 enables recorder 12 and step 130 updates the table of FIG. 2. After executing step 130, microprocessor 28 returns to the control loop.

Figure 6:
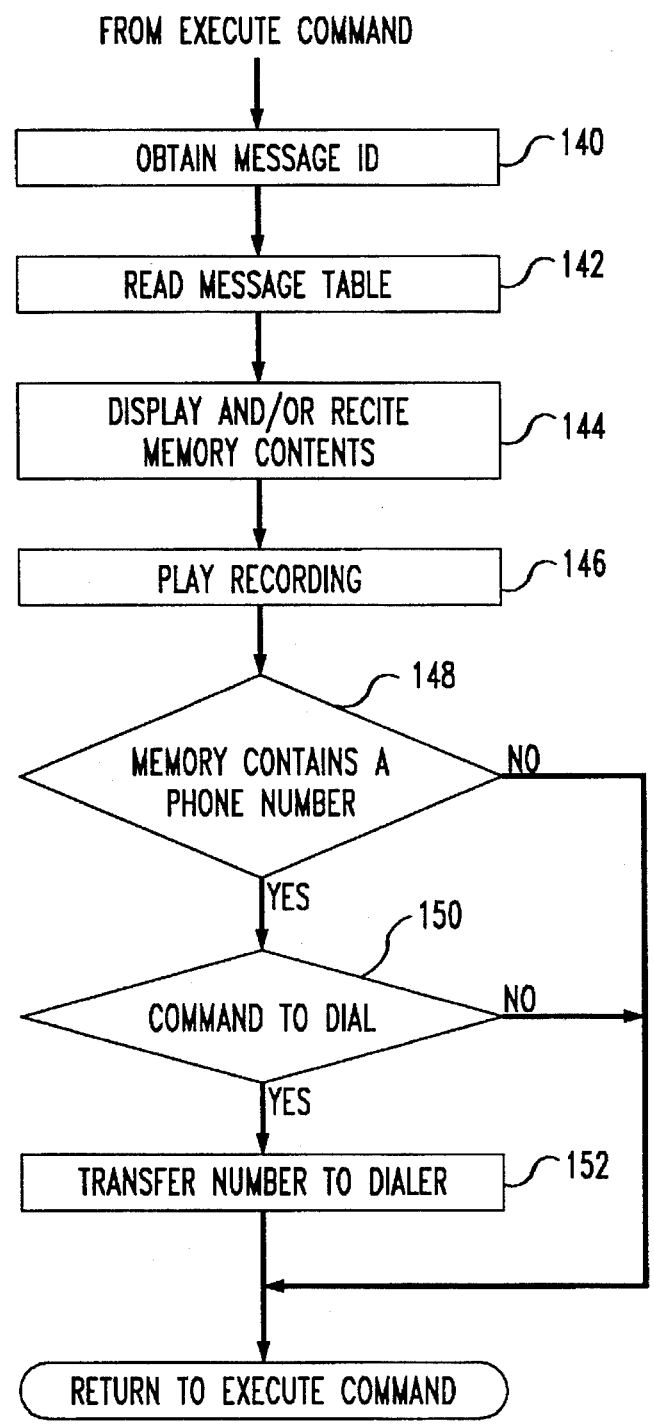
FIG. 6 is a flow chart of a play message command.

FIG. 6 illustrates a flow chart of the steps that are executed when the ; play message command is received. The play message command is executed after decision step 64 of FIG. 3, within execute command step 74 of FIG. 4 or within execute command step 104 of FIG. 5. The play message command begins by executing step 140 during which microprocessor 28 obtains the message ID and called party ID from the command. Message ID and called party ID can be in a form such as alphanumeric symbols that am entered using control pad 34 or a telephone keypad. Using the IDs obtained in step 140, step 142 reads the message table of FIG. 2. The information in the message table provides microprocessor 28 with the start and end addresses of the verbal message and phone number stored in recorder 12 and memory 18, respectively.

After retrieving the information from the message table, the phone number or "no number" message stored in memory 18 is displayed and/or recited by executing step 144. After executing step 144, step 146 plays the verbal message. After executing step 146, decision step 148 determines whether a phone number or a "no number" message was stored in memory 18. If a "no number" message was stored, microprocessor 18 returns to the point at which it was instructed to execute the play message command. If a number was stored in memory 18, decision step 150 is executed. In decision step 150 it is determined whether the called party has commanded the microprocessor to dial the number that was stored in memory 18. If no command is received, the microprocessor returns to the point at which it was asked to execute the play message command. If the called party commands the microprocessor to dial the number from memory 18, the microprocessor transfers the phone number to dialer 24 by executing command 152. Dialer 24 then automatically dials the number provided by microprocessor 28. After executing step 152, the microprocessor returns to the point at which it was asked to execute the message command.

It is possible to provide a variety of additional commands to microprocessor 28 by providing the appropriate programming. These commands may be similar to commands that are executed by present day answering machines and can be programmed by one of ordinary skill in the art.

I claim:

1. A message taking apparatus comprising:

storage means for storing a verbal message provided by a calling party, said storage means being located at a public exchange;

replay means for replaying said verbal message to a called party;

speech recognition means for obtaining a phone number from said verbal message; and calling means for using said phone number to place a call after receiving a verbal command from said called party.

2. A message taking apparatus comprising:

storage means for storing a verbal message provided by a calling party;

replay means for replaying said verbal message to a called party;

speech recognition means for obtaining a phone number from said verbal message;

prompt generation means for generating an audio signal that prompts said calling party to state said phone number and to restate said phone number when said speech recognition means can not obtain said phone number from said verbal message; and calling means for using said phone number to place a call.

3. The message taking apparatus of claim 2, further comprising display means for displaying said phone number.

4. The message taking apparatus of claim 2, further comprising speech generation means for generating an audio signal that conveys said phone number to said called party.

5. The message taking apparatus of claim 2, wherein said storage means is located at a public exchange.

6. The message taking apparatus of claim 2, wherein said storage means comprises a tape.

7. The message taking apparatus of claim 2, wherein said calling means places said call after receiving a command from said called party.

8. The message taking apparatus of claim 2, wherein said calling means places said call after receiving a verbal command from said called party.

9. The message taking apparatus of claim 2, wherein said storage means is located at a customer's premises.

* * * * *